April 20, 1965 O. A. LUNDBERG 3,178,876
WINDROW LIFTERS

Filed Sept. 8, 1961 4 Sheets-Sheet 1

INVENTOR.
OLAF A. LUNDBERG
BY Moore, White & Burd
ATTORNEYS

INVENTOR.
OLAF A. LUNDBERG

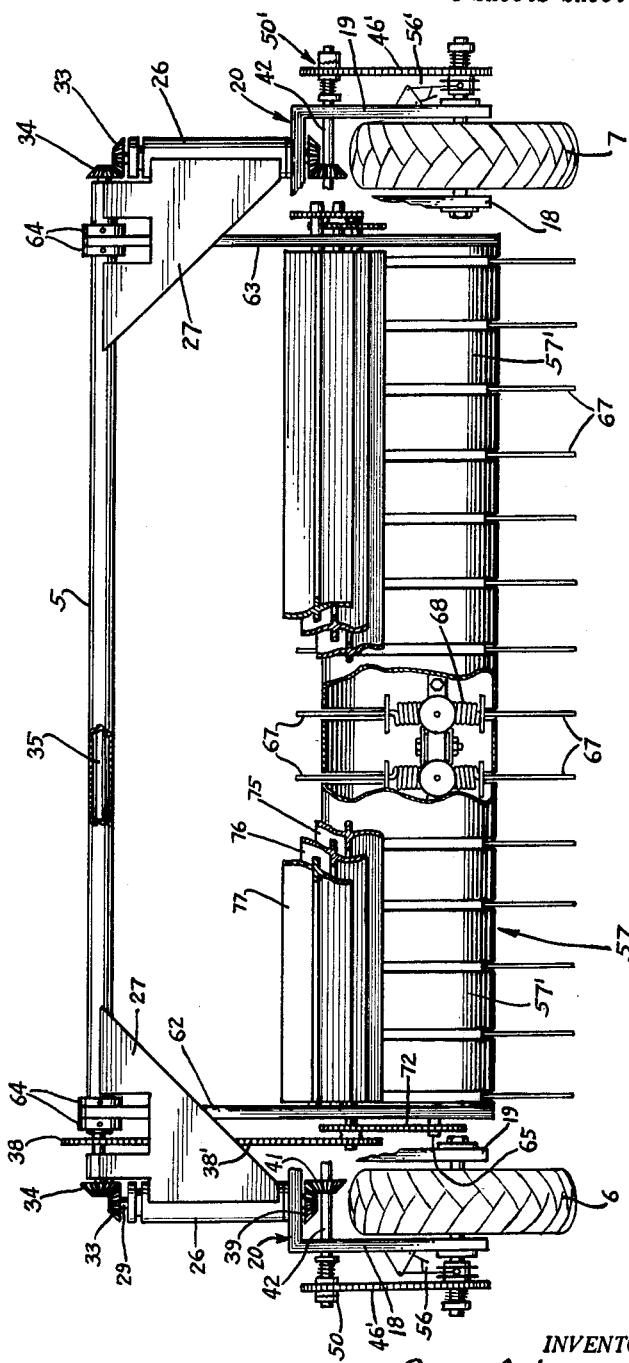

April 20, 1965   O. A. LUNDBERG   3,178,876
WINDROW LIFTERS

Filed Sept. 8, 1961   4 Sheets-Sheet 4

INVENTOR.
OLAF A. LUNDBERG
BY Moore, White & Durd
ATTORNEYS

United States Patent Office 3,178,876
Patented Apr. 20, 1965

3,178,876
WINDROW LIFTERS
Olaf Alfred Lundberg, 512 49th Ave. N.,
Minneapolis, Minn.
Filed Sept. 8, 1961, Ser. No. 136,769
8 Claims. (Cl. 56—372)

This invention relates to new and useful improvements in agricultural implements commonly known to the trade as windrow lifters. In recent years it has become quite common practice, when harvesting small grains and the like, to deposit the cut crop in windrows on the field thereby to facilitate subsequently gathering the crop when dry. When the crop is partially green or damp, it may be necessary in order to expedite the drying process of the crop, to lift the windrows over and replace them on dry ground on upstanding stubble to one side of where they were originally placed, when the grain was cut, thereby to permit air to circulate more freely through and beneath the windrows.

To thus lift the windrows from the ground and replace them on fresh stubble, particularly if the crop is ripe grain, it is highly desirable that such handling of the windrows be performed as gently as possible, to avoid knocking the grain from their hulls.

An object of the present invention therefore is to provide a windrow lifter which is so constructed that it gently and efficiently picks up the windrowed grain from its original place on the ground where the windrowed grain may have become firmly settled into the stubble, and bodily lifts the windrowed grain from its original place on the ground and deposits it to one side thereof on top of fresh dry upstanding stubble, whereby the windrowed grain is loosened up and will be supported directly on the stubble to permit air to circulate freely under and through the windrow to effect quick drying of the crop.

A further and more specific object of the invention is to provide an apparatus of the character described comprising an elongated rectangular frame having means at its forward end to connect or couple it to a tractor in such a manner that the elongated frame of the apparatus will be disposed at an oblique angle to the travel path of the tractor, and will be offset to one side of said travel path, whereby the tractor and windrow lifter may be operated without any of the ground engaging wheels of the tractor and windrow lifter passing over the windrowed or cut grain.

A further and more specific object of the invention is to provide a windrow lifter including an elongated frame comprising laterally spaced side members secured together in widely spaced relation by a plurality of tubular cross-members, said frame carrying a grain pickup device for picking up the windrowed grain and gently replacing it on the ground to one side of its original location and on the top of fresh upstanding stubble, said apparatus being provided at its rear end with a traction wheel having means for operatively connecting it to the pickup device or drum whereby the pickup device is driven independently of the tractor transmission, the tractor merely serving as a means for propelling the apparatus over the ground.

A further and more specific object of the invention is to provide a windrow lifter comprising a rectangular frame having means for coupling it to a tractor whereby it is obliquely disposed to the tractor, the obliquity of the windrow lifter being variable to adapt the apparatus to different operating conditions, the spaced side members of said frame being rigidly connected together at the front and rear ends of the frame by tubular cross-members, the rear tubular cross-member having a drive shaft mounted therein, the opposite ends of which are operatively connected to a pair of traction wheels through suitable clutches, and the pickup cylinder being mounted in a pair of supporting plates having their rear ends pivotally connected to the rear tubular cross-member, and having means for vertically adjusting the forward ends of said supporting plates to adjust the position of the pickup cylinder with respect to the ground surface, said composite frame being mounted on a plurality of ground engaging wheels whereby its entire weight is carried upon said wheels thus enabling the apparatus to readily follow the contour of the ground over which it travels.

Other objects of the inventions reside in the specific construction of the means for vertically adjusting the pickup frame; in the provision of the castor wheels for supporting the front corners of the frame; in the provision of the traction wheels at the rear corners of the supporting frame and the driving connections between said traction wheels and the drive shaft mounted at the rear of the windrow lifter; and in the simple and inexpensive construction of the apparatus, as a whole, whereby it may be manufactured at low cost; and in the simple construction of the means provided for coupling the windrow lifter to a tractor.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

In the drawings:

FIGURE 3 is a rear view of the apparatus partially broken away to more clearly illustrate the construction thereof;

Figure 1:
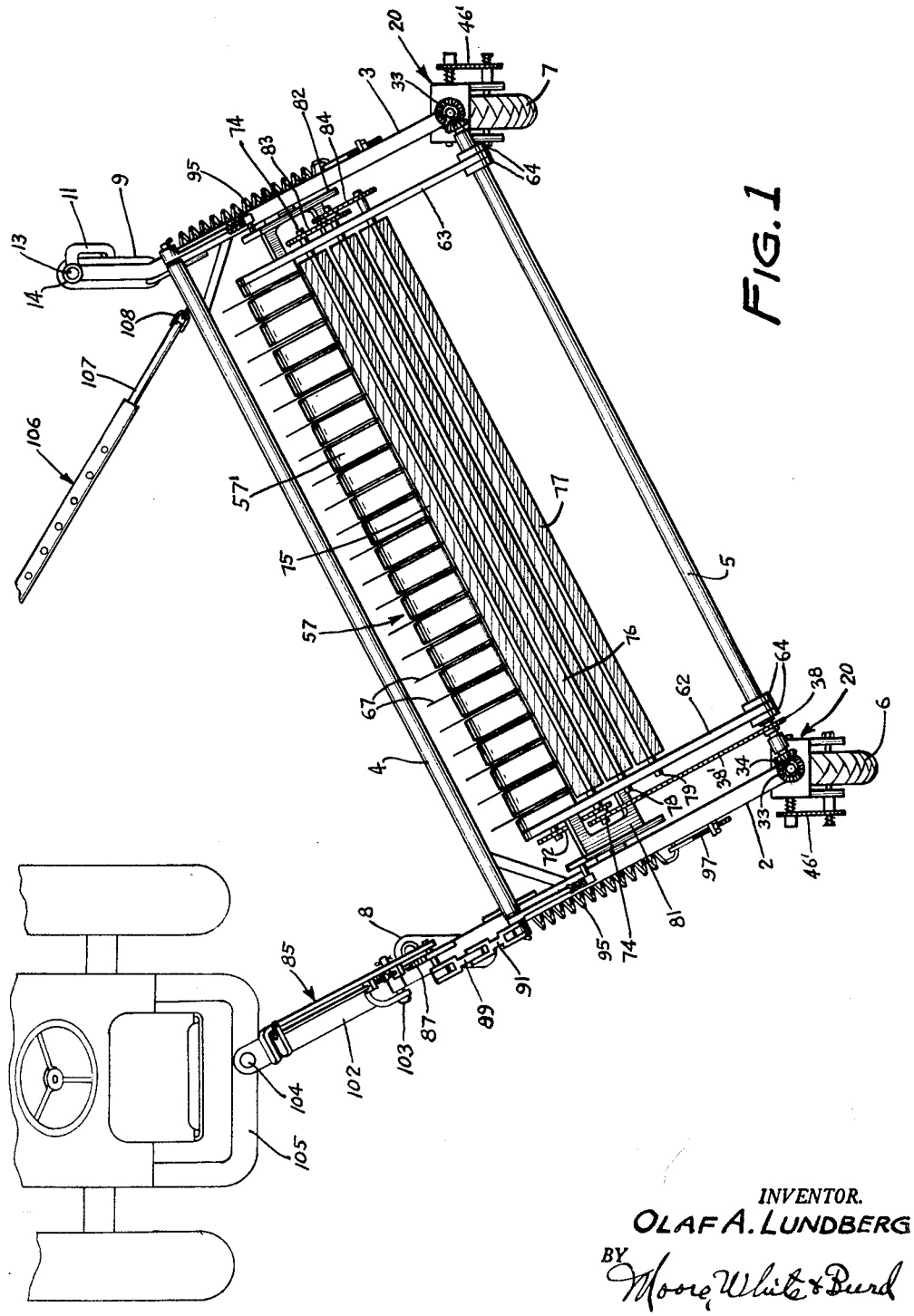
FIGURE 1 is a plan view of my improved windrow lifter showing its position relative to a towing tractor.

The novel windrow lifter herein disclosed is shown including an elongated supporting frame comprising laterally spaced side frame members 2 and 3, preferably of channel cross-section, secured together in widely spaced relation by front and rear tubular cross-members 4 and 5, respectively, to provide a lightweight, strong and rigid rectangular frame, as will be understood by reference to FIGURE 1.

Traction wheels, generally designated by the numerals 6 and 7 are shown mounted at the rear corners of the frame and are adapted for swinging movement about verical axes to permit free turning movement of the apparatus when in operation. Castor wheels 8 and 9 are preferably mounted at the forward corners of the frame whereby the frame is supported on the ground at its four corners. Each front castor wheel is mounted at the lower end of a supporting arm 11 having its lower end portion bent at right angles to provide an axle for its castor wheel. The upper portions 13 of arms 11 are received in vertical bearings 14 secured in the side frame members 2 and 3, as will be understood by reference to the drawings. In the drawings I have shown two traction wheels 6 and 7, located one at each rear corner of the supporting frame. As these traction wheels and their supporting means are substantially identical in construction but one will be described in detail.

Traction wheel 6 is shown secured to a shaft 15 mounted in suitable bearings 16 and 17 provided at the lower extremities of the arms 18 and 19, respectively, of a yoke generally designated by the numeral 20.

Figure 4:
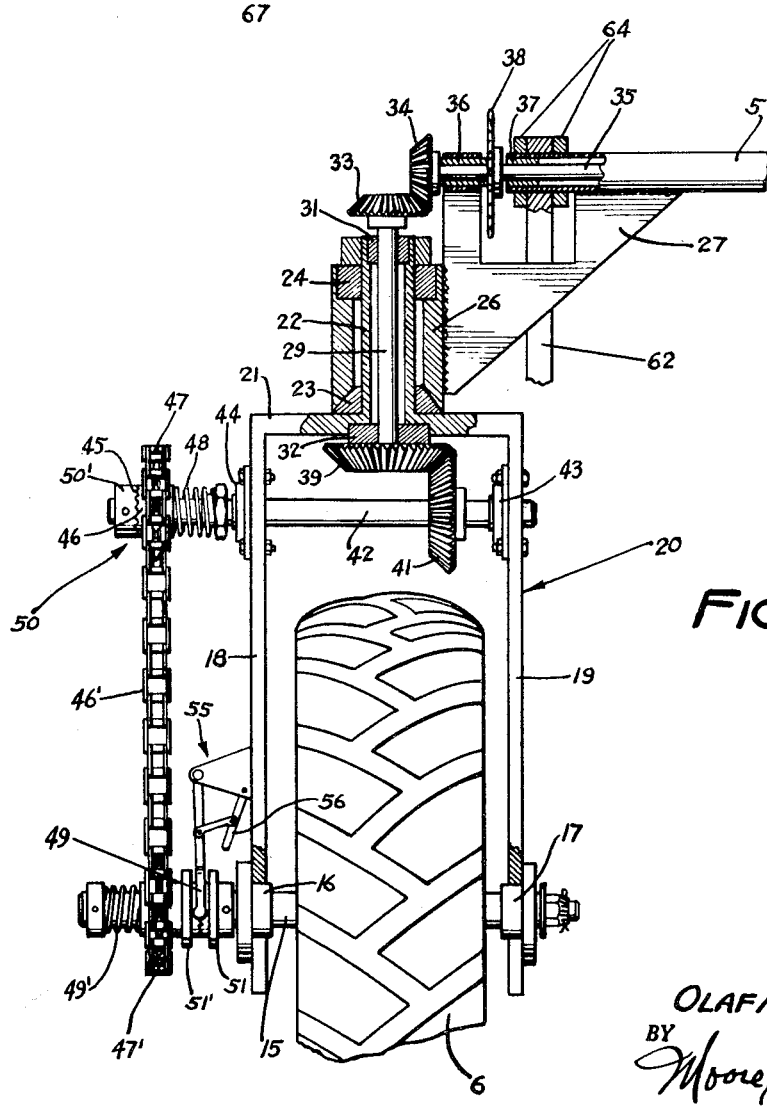
FIGURE 4 is an enlarged detail view of one of the traction wheels showing the driving connection between said wheel and the drive shaft located at the rear of the windrow lifter frame.

Each yoke is provided at its upper end with a horizontal portion 21 having the lower end of an upright sleeve member 22 secured to its intermediate portion. Sleeve member 22 is supported in bearings 23 and 24, non-rotatably secured in a hub 26 which constitutes a portion of the supporting frame of the machine. Each hub 26 is fixedly secured to the tubular cross-member 5 by angular gusset plates 27 having their upper vertical edges suitably welded to the hubs 26, and their horizontal edges to the tubular cross-member 5, as indicated in FIGURE 4. An upright shaft 29 is rotatably mounted within the sleeve member 22 in suitable bearings 31 and 32.

The upright shaft 29 is shown provided at its upper end with a bevel gear drive comprising intermeshing gears 33 and 34. Gear 33 is secured to the upper end of shaft 29, and gear 34 is secured to one end of a horizontal shaft 35, mounted in suitable bearings 36 and 37, as best shown in FIGURE 4. A sprocket wheel 38 is secured to shaft 35 between bearings 36 and 37 for direct rotation therewith. Secured to the lower end of the upright shaft 29 is a bevel gear 39 meshing with a similar gear 41 secured to a short shaft 42 mounted in bearings 43 and 44 secured in the upper portions of the arms 18 and 19 of yoke 20.

A conventional slip type clutch, generally designated by the numeral 50, is mounted on one end of shaft 42. Slip clutch 50 includes a collar 50' non-rotatably secured to shaft 42 and having V-shaped clutch teeth 45 normally engaged with similar clutch teeth provided on the adjacent end of the hub 46 of sprocket wheel 47. A chain 46' has a running connection with sprocket wheel 47 and a similar sprocket wheel 47' rotatably mounted on the shaft 15 of traction wheel 6. A spring 48 constantly urges the clutch teeth on collar 50' and the hub of gear 47 into driving engagement with one another. Main clutch, generally designated by the numeral 49, is provided for operatively connecting chain 46 with the shaft 15 of the traction wheel 6. The main clutch comprises a collar 51 secured to shaft 15, and a similar collar 51' secured to the adjacent end of the hub of sprocket 47'. Adjacent ends of collars 51 and 51' have intermeshing clutch teeth normally retained in driving engagement with one another by suitable compression spring 49'.

A main clutch operating mechanism, generally designated by the numeral 55, has an operating handle 56 which may be conveniently manipulated to shift the movable clutch element 51' out of driving engagement with the fixed clutch element 51, as will be understood by reference to FIGURE 4. In this figure the clutch operating mechanism 56 is shown in its operative position whereby the clutch member 51 secured to the shaft 15 of the traction wheel is interlocked with its complemental clutch member 51'. When so engaged, a driving connection is provided between the traction wheel and the drive shaft 42, as will be understood. When the operating lever 56 of the clutch 55 is actuated to move the clutch element 51' out of driving engagement with clutch element 51, the driving connection between the traction wheel and the shaft 42 is rendered inoperative.

The slip type clutches herein disclosed permit free turning movement of the apparatus even when the two clutches are engaged, because when one of the traction wheels travels faster than the other as, for example, the wheel on the outside of a turn, the clutch on the inner wheel will slip, while the one on the outside of the turn will drive shaft 42. When the apparatus is traveling in a relatively straight path, both clutches function equally.

Figure 2:
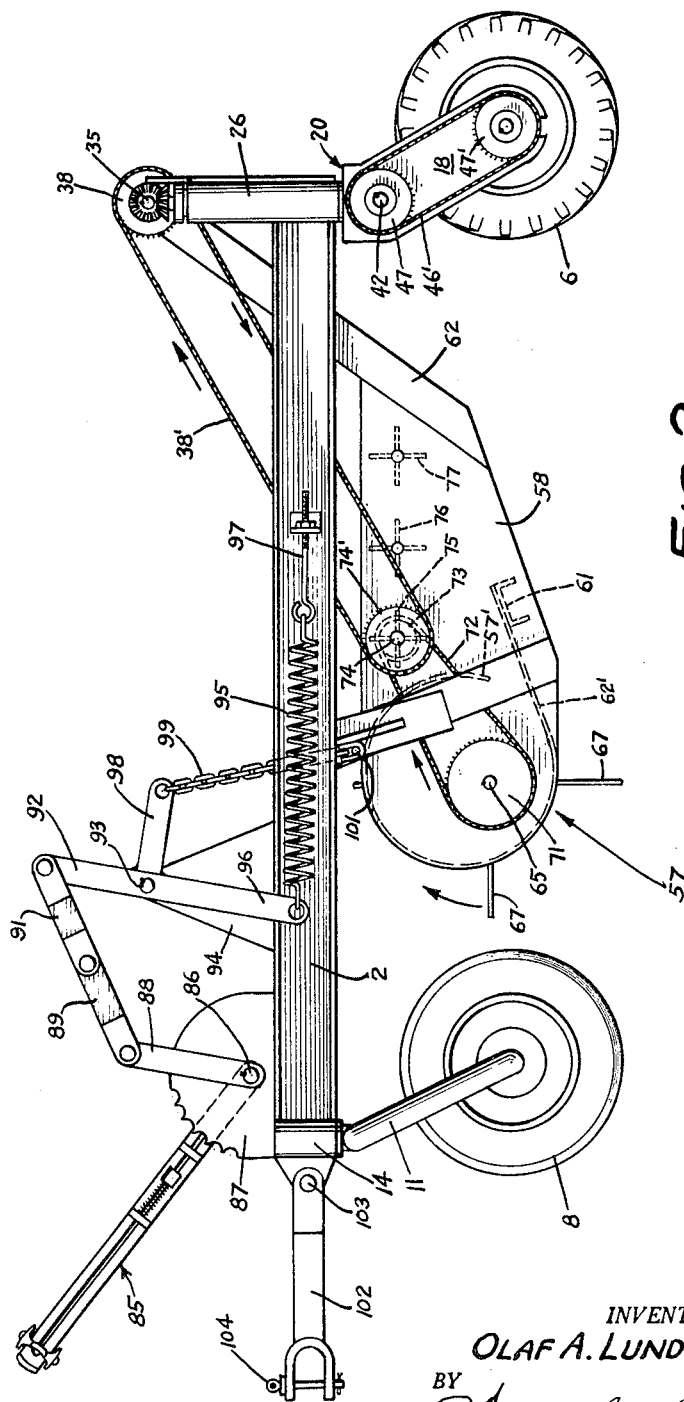
FIGURE 2 is a view showing the left hand end of the apparatus when viewed as shown in FIGURE 1.
Figure 5:
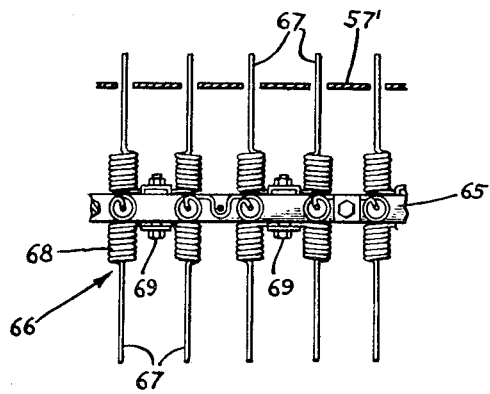
FIGURE 5 is a fragmentary view on an enlarged scale showing the spring mounting of the tines of the pickup cylinder.

The means provided for lifting the windrow off the ground and replacing it on the ground to one side of its original position, is shown comprising a pickup device, generally designated by the numeral 57, comprising side plates 58 and 59 shown secured together in spaced relation by a channel-like cross-member 61, indicated in FIGURE 2. Secured to the rear end portion of the side plates 58 and 59 are a pair of upwardly and rearwardly extending bars 62 and 63, respectively, between suitable collars 64—64.

By thus pivotally mounting the pickup drum 57 on the machine frame, the pickup drum may readily be vertically adjusted relative to the ground, as will subsequently be described. A shaft 65 is rotatably mounted in the side plates 58 and 59 and has a plurality of tine assemblies, generally designated by the numeral 66, secured thereto. Each tine assembly comprises a plurality of tines 67 shown integrally formed at the outer ends of spring elements 68, secured to the shaft 65 by such means as bolts 69. The spring portions 68 of the tines yieldably support the tines whereby they may readily yield, when they engage a fixed object, such as a stone. A plurality of curved elements 57' are interposed between the tines 67, as best shown in FIGURES 1, 2, 3 and 5, to strip the grain or other material from the tines during the operation of the machine. A sprocket 71 is secured to shaft 65 and a chain 72 is shown having running connections with sprocket 71 and a sprocket 73, the latter sprocket being secured to a shaft 74 having a fluted roller 75 secured thereto, as best shown in FIGURE 1. A second sprocket 74' is secured to shaft 74 and has a chain 38' connecting it to sprocket 38 secured to shaft 35 within the rear tubular frame member 5, see FIGURE 2. The shaft 65 upon which the tines are mounted is eccentrically disposed relative to the forward rounded end portions of side plates 58 and 59, and the curvature of the stripper bars or plates 57' coincides substantially with the rounded end portions of the side plates 58 and 59, as clearly illustrated in FIGURE 1.

By reference to FIGURES 1 and 3 it will be noted that the side plates 58 and 59 of the pickup device 57 are spaced inwardly from their respective channel side members 2 and 3 to provide adequate space for the drives for the fluted rollers 75, 76 and 77, secured respectively to shafts 74, 78 and 79, which have their terminals rotatably supported in suitable bearings provided in the side plates 58 and 59, as will be understood by reference to FIGURE 1. Spacing brackets 81 and 82 are secured to their respective end plates 58 and 59 and are guidingly supported in their up and down movements by guide bars or wear plates secured to the inner surfaces of the side channels 58 and 59. Fluted rollers 76 and 77 are driven from shaft 74 by chain drives 83 and 84 as noted at the right hand end of FIGURE 1.

The means for vertically adjusting the pickup cylinder relative to the ground is shown comprising a hand lever 85 pivoted to a short shaft 86 rotatably mounted in a quadrant 87 of the machine frame, as best illustrated in FIGURE 2. Also secured to shaft 86 is an arm 88 having interconnected links 89 and 91 connecting the upper end thereof to a relatively longer arm 92, pivoted at 93 to an upright bracket 94 secured to the machine frame. A suitable spring 95 has one end secured to the lower swingable end 96 of arm 92 and has its opposite end adjustably secured to the frame member by an eye bolt 97.

An arm 98 has one end fixed to the arm 92 for direct swinging movement therewith. A chain or other connection 99 operatively connects arm 98 to the lifting device 57, as indicated at 101 in FIGURE 2. If desired the shaft 93 may extend across the width of the machine so that a similar arm 98 may be secured thereto and to the windrow lifting device 57, thereby to facilitate the operation of vertically adjusting the lifting device.

Provided at the forward end of the machine frame is a coupling bar, generally designated by the numeral 102. This coupling bar is adapted for swinging movement in a vertical plane about a pivot 103 and the forward end of the coupling bar 102 is formed like a conventional clevis and has a coupling pin 104 whereby the apparatus may readily be coupled to the usual draw bar 105 of a conventional tractor, as indicated in FIGURE 1.

To maintain the angular relationship between the tractor and windrow lifter, a telescopic brace member, generally designated by the numeral 106, is shown having its inner telescopic member 107 pivoted to the machine frame at 108 adjacent to the outer end thereof. The opposite end of the telescopic member 106 is suitably connected to the forward end of the tractor frame by suitable means not shown in the drawings. Longitudinal adjustment of the diagonal brace member 106 makes it possible to vary the angular relationship between the tractor and the windrow lifter, thereby to assure most efficient operation of the apparatus.

The windrow lifter herein disclosed is extremely simple in construction. It comprises a rectangular frame constructed of structural steel readily available on the market. The frame is supported at its four corners, and the castor wheels located at the rear corners of the apparatus co-operate to provide the driving means for the pickup cylinder and fluted rolls carried thereon. In some instances where the effective width of the windrow lifter is made relatively smaller than here shown, a single traction wheel may suffice. When so constructed the traction wheel at the outer or right hand end of the windrow lifter, when viewed as shown in FIGURE 1, is eliminated. By coupling the apparatus to the tractor as herein disclosed the apparatus may readily follow the contour of the ground independently of the tractor and because of the pickup cylinder being driven from the traction wheel or wheels of the apparatus, special equipment need not be provided for coupling the pickup cylinder to the usual power take off shaft of the tractor.

It is apparent that many modifications and variations of the invention as hereinbefore set forth may be made without departing from the spirit and scope thereof. The specific embodiments described are given by way of example only and the invention is limited only by the terms of the appended claims.

I claim as my invention:

1. A windrow lifter embodying an elongated rectangular supporting frame comprising a front frame member, a rear tubular frame member spaced from the front frame member, and spaced apart end members, said end members being fixedly secured to the ends of said front and rear frame members to provide a rugged supporting frame, means for coupling said supporting frame to a tractor, plate members mounted for pivotal movement about the axis of said rear tubular frame member, a pickup drum rotatably mounted in the forward end portions of said plate members, a drive shaft located within said rear tubular frame member and having a driving connection with said pickup drum, and a traction wheel located at one end of said rear tubular frame member and having driving connection with said drive shaft.

2. A windrow lifter according to claim 1, wherein a plurality of spaced parallel fluted rollers are rotatably mounted in said plate members rearwardly of said pickup drum adapted to receive the material therefrom and gently deposit it on the ground in laterally spaced relation from where the windrow was picked up from the ground by the pickup drum.

3. A windrow lifter according to claim 2, wherein means is provided for coupling the windrow lifter to a power unit whereby the supporting frame of the windrow is disposed at an oblique angle to the power unit whereby the pickup drum is located to one side of the travel path of the power unit whereby the power unit does not pass over the material to be picked up, said means comprising an elongated coupling member pivotally connected to one end of said supporting frame and adapted to be coupled at the other end to the draw bar of a power unit, and an elongated draft member pivotally connected to the opposite end of said supporting frame and adapted to be connected to the front end of the power unit.

4. A windrow lifter according to claim 1, wherein the front corners of the rectangular supporting frame are supported on suitable castor wheels and a traction wheel is provided at each rear corner of said frame to cooperate with said front castor wheels to carry the weight of the windrow lifter, said traction wheels having driving connections with said drive shaft.

5. A windrow lifter according to claim 4, wherein an elongated coupling member is pivotally connected to one end of said supporting frame and has means at its forward end for coupling it to the usual drawbar of a tractor, and a telescopic draft member has one end pivoted to the opposite end of the supporting frame and has means at its forward end for connecting it to the forward end portion of the tractor, thereby to retain the windrow lifter frame at a predetermined angle relative to the travel path of the tractor.

6. A windrow lifter according to claim 4, wherein the driving means between each traction wheel and said drive shaft comprises an overload slip clutch and a main driving clutch.

7. A windrow lifter comprising an elongated rectangular frame including a front frame member and a rear tubular frame member, and end members of channel cross-section, said end members being rigidly secured to the ends of said front and rear frame members to provide a rugged frame structure, a pair of plate members mounted for pivotal movement adjacent to each end member, a pickup drum rotatably mounted in the forward ends of said plate members, a plurality of fluted transfer rollers rotatably mounted on said plate members rearwardly of said pickup drum, means for simultaneously driving said pickup drum and said transfer rollers, linkage connected with said plate members and having spring means operatively connected therewith for counterbalancing a portion of the weight of the pickup drum and its supporting plates, a lever pivoted to the forward end of said frame and having articulated linkage connecting it to the linkage of the pickup drum, said articulated linkage permitting the pickup drum to ride over irregularities in the ground surface without changing the position of the adjusting lever.

8. A windrow lifter comprising a pair of spaced apart front and rear frame members, one of said frame members being tubular, spaced apart end members, said end members being fixedly secured to the ends of said front and rear frame members to provide a rugged supporting frame, pickup means rotatably mounted within said frame, a drive shaft located within said tubular frame member and having a driving connection with said pickup means, a rotatable swivel mounted traction wheel located at each end of said tubular frame member and each having a driving connection with said drive shaft, said last named driving connection comprising a short shaft parallel to the axis of rotation of said traction wheel, an upright shaft extending from said short shaft to said drive shaft, bevel gears at opposite ends of said upright shaft intermeshing with bevel gears on said short shaft and said drive shaft, and a further driving connection from the shaft at said axis of rotation of said traction wheel to said short shaft.

References Cited by the Examiner
UNITED STATES PATENTS

| | | | |
|---|---|---|---|
| 1,631,455 | 6/27 | Bamford et al. | 56—400 |
| 2,582,177 | 1/52 | Swisher et al. | 56—25.4 X |
| 2,595,177 | 4/52 | Stevens | 56—364 |
| 2,718,746 | 9/55 | Prischmann | 56—372 |
| 2,741,892 | 4/56 | Collette | 56—372 |
| 2,992,525 | 7/61 | Irish | 56—372 |

T. GRAHAM CRAVER, *Primary Examiner.*

ANTONIO F. GUIDA, ARNOLD RUEGG, *Examiners.*